United States Patent [19]

Nievelt

[11] 4,213,272
[45] Jul. 22, 1980

[54] DEVICE FOR SUPPORTING TOMATO PLANTS

[76] Inventor: Frank J. Nievelt, 423 S. Campbell, Royal Oak, Mich. 48067

[21] Appl. No.: 930,378

[22] Filed: Aug. 2, 1978

[51] Int. Cl.² ............................................. A01G 17/06
[52] U.S. Cl. ............................................. 47/45; 47/47
[58] Field of Search ................... 47/43, 46, 47, 23, 39, 47/66, 70

[56] References Cited

U.S. PATENT DOCUMENTS

| 2,763,096 | 9/1956 | Roger | 47/45 |
|---|---|---|---|
| 2,785,508 | 3/1957 | Coleman | 47/66 |
| 3,105,327 | 10/1963 | Gasper | 47/47 |
| 3,803,759 | 4/1974 | Heinecke | 47/47 |
| 3,816,959 | 6/1974 | Nalle | 47/23 |

FOREIGN PATENT DOCUMENTS

| 722648 | 3/1932 | France | 47/47 |
|---|---|---|---|
| 7513612 | 5/1977 | Netherlands | 47/45 |
| 175924 | 3/1935 | Switzerland | 47/47 |

Primary Examiner—Edgar S. Burr
Assistant Examiner—James R. Feyrer
Attorney, Agent, or Firm—Whittemore, Hulbert & Belknap

[57] ABSTRACT

A device for use by gardeners in growing vines for raising tomatoes and other vine growing vegetables, consisting of a series of horizontal plates of a transparent material supported one above the other by a series of struts between the plates. The plates have central cut-out portions to provide room for vertical growth of the vine upwardly through successive plates. The plate structure is held in place by stakes embedded in the ground with their upper ends secured to the plates.

2 Claims, 4 Drawing Figures

DEVICE FOR SUPPORTING TOMATO PLANTS

SUMMARY OF THE INVENTION

The invention relates to a device for use by gardners raising tomatoes or other vegetables that grow on vines. It is common to provide stakes to which the vines can be tied in order to keep them off the ground. The improvement of this invention eliminates the necessity for tying the vines and provides a structure in which the vines support themselves above the ground while growing to their normal extent and remaining free from the ground. The device consists of a series of horizontal plates of transparent material to let the sunlight through. The bottom plate rests on the ground while the other plates are arranged above it and are all secured together by a series of struts intermediate the successive plates. For simplicity, all plates are practically identical and each has a central cut-out portion through which the vine can grow upwardly. A preferred cut out is of star shape. Each of the plates has holes arranged in a circle for receiving the ends of the struts. The plates also have aligned holes near the periphery through which stakes (e.g. broom poles) may be inserted with their lower ends embedded in the ground by pounding. The assembly of plates, intermediate struts, and stakes forms a unit structure which is readily installed by the gardener with each individual tomato plant. Once installed, the vines remain in place with the vegetables off of the ground without further care other than watering and harvesting.

Figure 1:
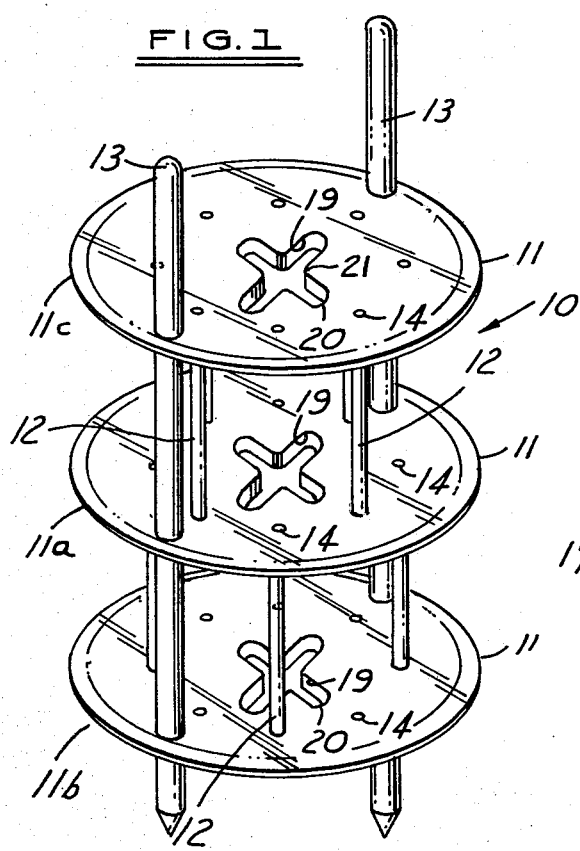
FIG. 1 is a perspective view of the device showing the staggered arrangement of struts together with the tomato vine growing through the central cut-outs in the plates.
Figure 2:
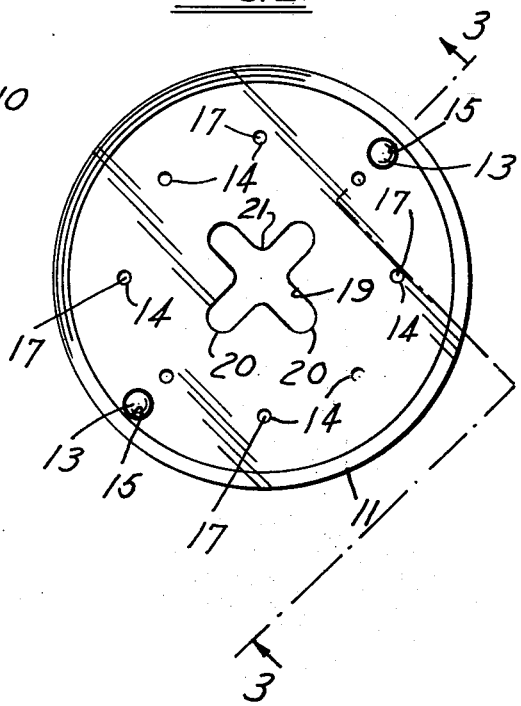
FIG. 2 is a plan view.
Figure 3:
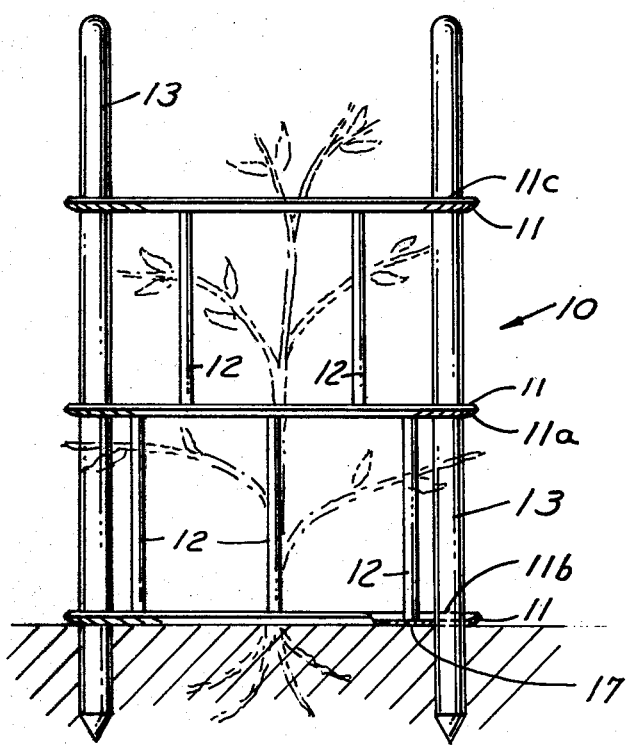
FIG. 3 is a sectional view on line 3—3 of FIG. 2.
Figure 4:
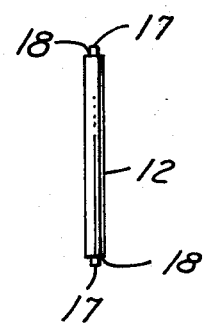
FIG. 4 is a detail of one of the struts.

Referring now to the embodiment of the invention illustrated in the drawings, the device 10, shown in perspective in FIG. 1, is an assembly built up from a plurality of identical plates 11, struts 12 and stakes 13. While the exact size of the parts may be varied, it will be convenient to refer to a typical device that is practical for use with tomato plants. Each plate 11 has a diameter of 24 inches and a series of ⅜" holes 14 (eight in number) arranged in a circle 16" in diameter. Each plate also has diametrically opposite 2" holes 15 permitting insertion therethrough of the stakes 13. The struts 12 are all identical about ½" in diameter having reduced end portions 17 (⅜" in diameter) forming shoulders or collars 18.

The cut-out portion 19 in each plate is star shaped with a maximum diametrical distance of 10" at the points 20 of the star and a minimum diameter of 8" at points 21 intermediate the points 20.

In assembling the device, the bottom plate 11B is secured to the adjacent plate 11A by four circumferentially spaced struts. The next adjacent plate 11C is secured to the plate 11A by four other struts staggered with respect to the lower set of struts as illustrated in FIG. 1. The normal distance between the plates is 12 inches and when desired, a fourth tier may be added by using another similar plate connected to the previously mentioned top plate by another set of four struts which will be aligned with the first set of struts rising from the bottom plate.

Various materials may be used for the plates and struts, but it is desirable that they should be transparent or translucent to permit the sun's rays to pass through onto the growing plant. Any clear plastic such as plexiglass is practical for both plates and struts. The plates are circular and of sufficient thickness to provide adequate strength. The circumferential edges are slightly turned up as illustrated. The lower plate rests in the ground which tends to keep the ground moist during hot weather.

While dimensions have been given for a practical device, the plates can, of course, be made in any size, diameter and thickness and not necessarily circular. Also the intermediate supporting struts can be of any desired length thus varying the distance between the plates. It has been found that the device of the invention protects tomatoes from ground worms and grubs and at the same time, helps keep the tomatoes healthy with earlier ripening.

What I claim as my invention is:

1. A device for use with growing tomatoes vines comprising a series of horizontal light transmitting plates spaced vertically to form at least three tiers, each plate having a circular periphery and a substantially imperforate solid surface extending inwardly therefrom to near the center thereof with a central opening through which the tomato vine stalk may grow upwardly with its side tomato bearing shoots spreading outwardly and laterally over the upper surfaces of the plates, said plates forming supporting shelves for the entire area between said central opening and the outer periphery, a series of vertical struts between the plates of each tier, each strut having a portion of reduced diameter with an intermediate shoulder, said plates each having a series of circumferentially spaced holes in the substantially imperforate solid shelf-forming surface for receiving said struts with said shoulder abutting said solid surface, at least two stakes for insertion into the ground, each of said stakes extending through each of said plates, said central opening in said plates being substantially less than one-third the diameter of said plate permitting vertical growth therethrough of the vines and support of the lateral growth and the tomatoes developed on said vines by said plates; in which each of said plates is substantially the same as the others, with eight circumferentially spaced holes, there being four struts between each tier with said reduced end portions inserted in alternate of the eight holes in the first tier, the four struts in the next adjacent tier being inserted in the unfilled holes of said first tier, and wherein also the cut out portions in each plate are star shaped and in vertical alignment.

2. A device according to claim 1 in which each plate is circular and substantially flat in a horizontal plane with the peripheral edge turned upwardly from said plane, and in which the cut out central portions of each plate are so small in comparison with the total area of the imperforate portions of the circular plate, that the plates form a vertical series of shelves for gravity support of the spreading vines and the tomatoes born thereby for more than one half of the total area within the circular periphery of said plates.

* * * * *